UNITED STATES PATENT OFFICE 2,227,102

PAINTS, PRINTING INKS, AND THE LIKE

Arloe R. Olsen, Wilmington, Del., assignor to Hercules Powder Company, Wilmington, Del., a corporation of Delaware No Drawing. Application November 1, 1937,
Serial No. 172,275

4 Claims. (Cl. 260—736)

This invention relates to compositions containing a drying oil or a semi-drying oil and minor amounts of chlorinated rubber, such compositions being particularly useful in paints, printing inks and the like.

House paints ordinarily consist of a drying oil, such as, for example, linseed oil in which a pigment, such as, white lead, has been dispersed together with driers and various thinners such as turpentine, mineral spirits and the like for the purpose of attaining the proper consistency. Although such compositions have been used for many years, it was recognized that they suffered from many disadvantages. Various modifications have been made but none of them materially improved the properties of the original paint.

In a similar manner, printing inks consist essentially of a drying oil, suitably treated for this purpose, to which suitable pigments are added in order to obtain any desired color. Driers are also usually added. However, the inks of the prior art, also suffer from many disadvantages and although various modifications have been made in the past in order to overcome some of the difficulties, no marked improvement has resulted.

Now in accordance with this invention, I have found that materially improved drying oil or semi-drying oil compositions can be obtained by adding thereto small amounts of chlorinated rubber, such compositions being particularly useful in the field of house paints, printing inks and the like. Desirably, the chlorinated rubber employed will have a chlorine content of from about 60% to about 70% and a viscosity characteristic depending upon the desired properties of the ultimate product.

The process in accordance with this invention consists essentially of adding chlorinated rubber to the drying oil or semidrying oil composition either by directly dissolving said chlorinated rubber in the oil at a slightly elevated temperature or by adding the chlorinated rubber, dissolved in a suitable solvent, to the drying oil or semi-drying oil composition, the solvent being also miscible with the said oil. The compositions containing the chlorinated rubber may then be applied in the same manner as those used in the prior art, all of which are familiar to those skilled in the art. It will be understood that various other materials may be added to those chlorinated rubber drying oil or semi-drying oil compositions, such as, for example, driers, pigments, dyes, solvents, etc., in order to obtain certain specific properties.

I have found, in accordance with my invention, that the optimum quantity of chlorinated rubber to add to the oil is about 2.5% to about 10% by weight of the oil. This amount of chlorinated rubber in the case of an oil paint for example, makes possible quicker drying, longer life on exposure to weathering, improved chemical resistance because of the high acid and alkali resistance of chlorinated rubber, and greater gloss retention and increased tint retention due to the decrease in chalking. All of these improvements gained by using chlorinated rubber in paints can be attributed to the unique properties of chlorinated rubber, which were not available heretofore in any single paint ingredient.

In the case of printing inks, the addition of a similar amount of chlorinated rubber speeds up the drying of the ink which allows the presses to be run faster and the printed sheets to be stacked higher without blocking. Furthermore, the chemical resistance of the ink, especially to alkalies, is considerably improved by the addition of chlorinated rubber which is of great importance in the printing of soap wrappers, soap boxes, etc.

In the practical adaptation of my invention when making, for example, a printing ink, I take chlorinated rubber, preferably having a viscosity from about 5 centipoises to about 20 centipoises, and dissolve it in a lithographic varnish by heating to a temperature of about 60° C. to about 125° C. After a homogeneous solution is obtained, this mixture is allowed to cool and various additions, such as, pigments, driers, etc. then made, the addition of these materials depending upon the color desired and the process for which the ink is desired. The pigments used may be any of the many well known to the art and will be dispersed in suitable media by methods also well known to the art.

The following are shown as typical formulae for printing inks containing chlorinated rubber, compositions being in parts by weight.

|  | #1 | #2 | #3 |
|---|---|---|---|
| Lithographic varnish* (low viscosity) |  |  | 25.0 |
| Lithographic varnish* (medium viscosity) | 21.0 | 44.0 |  |
| Lithographic varnish* (high viscosity) | 16.0 |  | 15.0 |
| 15 gal. linseed oil-ester gum varnish | 2.0 |  |  |
| Chlorinated rubber 5 centipoises | 3.9 | 3.08 |  |
| Chlorinated rubber 10 centipoises |  |  | 4.0 |
| Lead linoleate | 6.0 | 6.0 | 4.0 |
| Organic red pigment, dry | 16.0 |  |  |
| Gloss white, dry {25% alumina / 75% barium sulfate} | 26.0 |  |  |
| Aluminum hydrate, dry | 13.0 |  |  |
| Wax offset compound** |  | 2.0 | 6.0 |
| Blue pigment, dry |  | 48.0 |  |
| Chrome yellow, dry |  |  | 50.0 |
| Percent chlorinated rubber based on oil | 10 | 7 | 10 |

\* Lithographic varnishes are essentially boiled linseed oil.
\*\* Wax offset compound can be petroleum wax, grease, tallow or a common ordinary soap.

In the practical adaptation of my invention to house paints, chlorinated rubber having a viscosity preferably from about 20 centipoises to about 125 centipoises is added to paints from solution in a solvent such xylol, coal tar naphtha, etc. The paint as before mentioned will consist essentially of a drying oil, or a semi-drying oil, having a pigment or a combination of pigments with or without inert extenders, such as, for example, asbestine, dispersed therein by methods well known to the art. Various other additions may also be made such as driers, thinners, etc. to obtain specific characteristics. The improved paints of my invention may be applied in the same way as the prior art paints.

The following are shown as typical formulae for paints containing chlorinated rubber, compositions being in parts by weight.

|  | #1 | #2 | #3 |
|---|---|---|---|
| Chlorinated rubber—125 centipoises | 2.5 | 10.0 | 10.0 |
| Raw linseed oil | 97.5 | 90.0 | 60.0 |
| Soya bean oil |  |  | 30 |
| Basic carbonate white lead | 388.0 | 380.0 | 380.0 |
| Lead—cobalt naphthenate solution* | 3.8 | 3.4 | 5.5 |
| Hi-flash naphtha | 23.0 | 45.0 | 45.0 |

*This solution added such that 0.2% of lead and 0.03% of cobalt on the basis of oil, are present as free metal.

|  | #4 | #5 |
|---|---|---|
| Chlorinated rubber—20 centipoises | 8.9 | 10.6 |
| Pigment paste A* | 503.5 |  |
| Pigment paste B* |  | 490.8 |
| Raw linseed oil | 58.5 | 111.0 |
| Amberol blending varnish** | 42.8 |  |
| Coal tar naphtha (boiling range 150° C. to 200° C.) | 17.8 | 21.2 |
| 24% lead drier | 1.5 | 1.8 |
| 6% cobalt drier | 0.9 | 1.0 |
| Lamp black paste*** |  | 7.1 |

*Pigment paste compositions

|  | A | B |
|---|---|---|
| Titanox B {titanium dioxide—25% / barium sulfate—75%} | 473.0 |  |
| White lead | 473.0 |  |
| Lithopone |  | 468.0 |
| 35% leaded zinc oxide |  | 528.0 |
| Asbestine | 236.4 | 176.4 |
| Raw linseed oil | 325.0 | 300.0 |

**Amberol blending varnish

|  | Per cent |
|---|---|
| Modified phenol formaldehyde resin | 33.8 |
| China-wood oil | 26.2 |
| Xylol | 40.0 |

***Lamp black paste

|  | Per cent |
|---|---|
| Lamp black | 26.0 |
| Linseed oil | 74.0 |

Any of the common drying or semi-drying oils among which are, for example, linseed oil, China-wood oil, oiticica oil, soya-bean oil, rapeseed oil, etc., may be used with chlorinated rubber to produce the improved compositions according to my invention.

Wherever I refer to chlorinated rubber as having a certain viscosity, I mean the viscosity in centipoises, of a 20% by weight solution of the chlorinated rubber in toluene, determined at 25° C. in a capillary type viscometer.

It will be understood that this invention contemplates broadly the addition of chlorinated rubber to a drying or a semi-drying oil, the chlorinated rubber being present in minor amounts, preferably from about 2.5% to about 10% by weight of the drying oil. Various additions may be made thereto, as well known in the art, to obtain specific properties.

It will be further understood that the examples above given are by way of illustration only and that the scope of my invention is not to be limited thereto.

It will be understood that the printing inks herein referred to are printing inks having a lithographic varnish as a base.

What I claim and desire to protect by Letters Patent is:

1. An oil base coating composition of the character of paints and printing inks, the composition comprising as a major film forming ingredient an oil selected from the group consisting of linseed oil, China-wood oil, oiticica oil, soya-bean oil, and rapeseed oil, and a minor quantity of chlorinated rubber, the chlorinated rubber being in amount between about 2.5% and about 10% by weight of the oil, and imparting improved durability and drying properties to coatings prepared from the composition while having substantially no adverse effect upon the ease of application of the composition.

2. An oil base coating composition of the character of paints and printing inks, the composition comprising linseed oil as a major film forming ingredient and a minor quantity of chlorinated rubber, the chlorinated rubber being in amount between about 2.5% and about 10% by weight of the oil, and imparting improved durability and drying properties to coatings prepared from the composition while having substantially no adverse effect upon the east of application of the composition.

3. An oil base coating composition of the character of paints and printing inks, the composition comprising China-wood oil as a major film forming ingredient and a minor quantity of chlorinated rubber, the chlorinated rubber being in amount between about 2.5% and about 10% by weight of the oil, and imparting improved durability and drying properties to coatings prepared from the composition while having substantially no adverse effect upon the ease of application of the composition.

4. An oil base coating composition of the character of paints and printing inks, the composition comprising soya-bean oil as a major film forming ingredient and a minor quantity of chlorinated rubber, the chlorinated rubber being in amount between about 2.5% and about 10% by weight of the oil, and imparting improved durability and drying properties to coatings prepared from the composition while having substantially no adverse effect upon the ease of application of the composition.

ARLOE R. OLSEN.